RAYMOND & BRASSINGTON.
SELF LOCKING NUT.
No. 46,389. Patented Feb. 14, 1865.
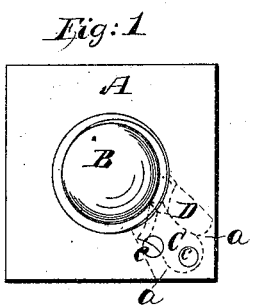
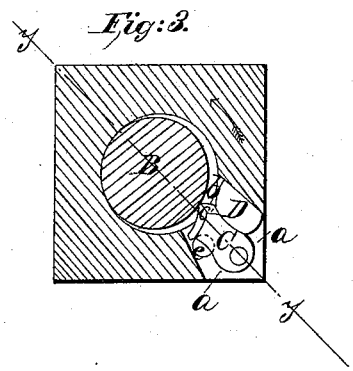
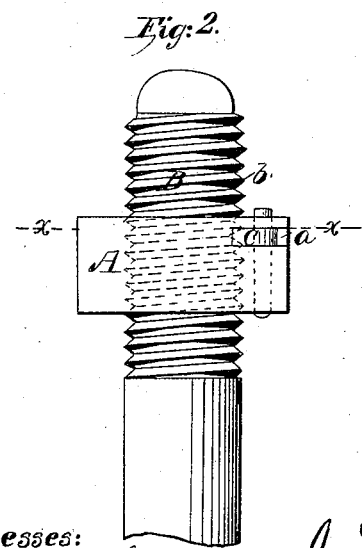

UNITED STATES PATENT OFFICE.

J. H. RAYMOND AND W. J. BRASSINGTON, OF BROOKLYN, NEW YORK.

IMPROVED SELF-LOCKING NUT.

Specification forming part of Letters Patent No. 46,389, dated February 14, 1865.

*To all whom it may concern:*

Be it known that we, JAMES H. RAYMOND and WALTER J. BRASSINGTON, both of the city of Brooklyn, in the county of Kings and State of New York, have invented a new and useful Improvement in Self-Locking Nuts for Screw-Bolts; and we do hereby declare that the following is a full, clear, and exact description of the same, reference being had to the accompanying drawings, forming part of this specification, in which—

Figure 1 is a plan of our improved nut applied to a bolt. Fig. 2 is a side view of the same. Fig. 3 is a horizontal section on line $x\,x$.

Similar letters of reference indicate corresponding parts in the several figures.

The object of our invention is to prevent nuts from unscrewing on screw-bolts; and to this end it consists, first, in providing the nut with a dog, which is pressed against the surface of the screw-thread of the bolt by a spring, and so arranged that it will bite into the thread of the bolt whenever there is any tendency to turn back the nut, while it allows the nut to turn freely in the other direction. To enable the nut to be unscrewed or turned back, the dog must be pressed back and held out of contact from the face of the thread; and our invention consists, secondly, in providing a hole in the nut so arranged to meet the aforesaid slot as to admit a pin or other instrument to press back the dog from the thread when desired.

To enable others skilled in the art to construct nuts according to our invention, we will proceed to describe it with reference to the drawings.

A is a nut, which may be square or of any other shape, and is provided with a slot, $a$, which passes from the outside to the inside to receive the dog C and allow it to act on the outside surface of the thread $b$ on the bolt B. The dog C is secured to the nut, inside of the slot $a$, by the pin $c$, on which it works loosely. The end of the dog that acts on the surface of the screw-thread of the bolt is so shaped as to fit the space between those threads, as seen at $c'$, Fig. 3, and allow this part of the dog to work between the threads.

D is the spring, arranged within the slot $a$ to press the dog against the screw. This spring is represented as composed of a piece of vulcanized india-rubber, and kept in place by a cavity formed in the back of the dog; but it may be made of steel.

When there is any tendency to unscrew the nut or turn it back in the direction of the arrow shown in Fig. 3, the friction of the dog between the screw-threads of the bolt assists the spring to press the dog toward the imaginary line $y\,y$, drawn through the centers of pin $c$ and bolt B, thereby causing it to approach the center of the bolt, and so causing it to bite into the thread thereof and preventing the nut from turning; but yet the nut is free to turn in the opposite direction, as the friction of the dog is then opposed to the pressure of the spring, and tends to carry its point away from the line $y$ and away from the center of the bolt, and thereby free it from the thread of the latter.

It will be thus clearly seen that the dog $c$ allows the nut to turn in one direction only.

To enable the nut to be unscrewed when necessary, a hole, $e$, is bored through the outer face of the nut into the slot $a$, so as to expose a portion of the dog C to the action of a pointed tool, which is forced into said hole for the purpose of pressing and holding the biting-point $c'$ of the dog C away from the surface of the screw-thread of the bolt.

The advantages of our invention are, that it can be applied to any screw-bolt and will work on any part of the thread without requiring ratchet notches or teeth on the thread or other portion of the bolt, like some other self-locking nuts.

What we claim as our invention, and desire to secure by Letters Patent, is—

1. The dog C, so applied within the nut and held in contact with the screw-thread of the bolt by a spring that by any tendency to turn the nut in one direction the friction of the said dog on the surface of the said thread is caused to draw its point toward the center of the bolt, and so make it bite the thread at any part of its surface, substantially as herein described.

2. The hole $e$, in combination with the dog C and the slot $a$ in the nut, substantially as and for the purpose herein specified.

J. H. RAYMOND.
W. J. BRASSINGTON.

Witnesses:
J. W. COOMBS,
GEO. W. REED.